United States Patent [19]

Galati et al.

[11] Patent Number: 4,630,052

[45] Date of Patent: Dec. 16, 1986

[54] SUPPRESSOR OF SECOND-TIME-AROUND CLUTTER ECHOES FOR MTI PULSE RADAR PROVIDED WITH POWER OSCILLATOR

[75] Inventors: Gaspare Galati; Ennio Giaccari, both of Rome, Italy

[73] Assignee: Selenia-Industrie Elettrotechniche Associate S.p.A., Rome, Italy

[21] Appl. No.: 607,204

[22] Filed: May 4, 1984

[30] Foreign Application Priority Data

May 4, 1983 [IT] Italy .............................. 48219 A/83

[51] Int. Cl.⁴ .............................................. G01S 7/28
[52] U.S. Cl. ................................................... 342/159
[58] Field of Search ............. 343/5 CE, 5 CF, 5 DP, 343/5 FT, 5 NQ, 5 VQ, 7.7, 8, 171.1 PF, 17.1 R; 367/97

[56] References Cited

U.S. PATENT DOCUMENTS

| 3,023,409 | 2/1962 | Smith et al. | 343/7.7 |
| 3,312,969 | 4/1967 | Halsted | 343/5 DP |
| 3,706,990 | 12/1972 | Carré | 343/7.7 |
| 4,459,592 | 7/1984 | Long | 343/7.7 |

OTHER PUBLICATIONS

Introduction to Radar Systems-Second Edition-Merrill Skolnik, pp. 2, 3, 105, 106, 114, 117, 119, 139.
On the Aximuthal Accuracy of an FFT-Based Signal Process for Air Traffic Control Radars-E. Cristofalo et al-pp. 8-15, "Revista Tecnica Selenia" (vol. 7, No. 1).

Primary Examiner—Thomas H. Tarcza
Assistant Examiner—Bernarr Earl Gregory
Attorney, Agent, or Firm—Karl F. Ross; Herbert Dubno

[57] ABSTRACT

A device for suppressing second-time-around echoes from far-out clutter in an MTI pulse radar lies in shunt with a digital signal processor connected to the receiver output of the radar whose transmitter includes a power oscillator maintaining phase coherence only for the duration of an outgoing pulse. In order to minimize the occurrence of blind speeds, the oscillator is triggered for different pulse-repetition frequencies of predetermined values in alternate scanning intervals each lasting for an antenna rotation by half a beamwidth. Echoes from a group of radar pulses emitted in one interval are accumulated and then compared in magnitude with accumulated echoes from another such group emitted in an adjoining interval. If these magnitudes—relatively adjusted to compensate for the different numbers of pulses per group—are substantially equal over a sequence of antenna revolutions, they are classified as due to second-time-around clutter echoes and the output signal of the processor is eliminated for the corresponding scanning intervals.

6 Claims, 6 Drawing Figures

//=== PAGE END ===//

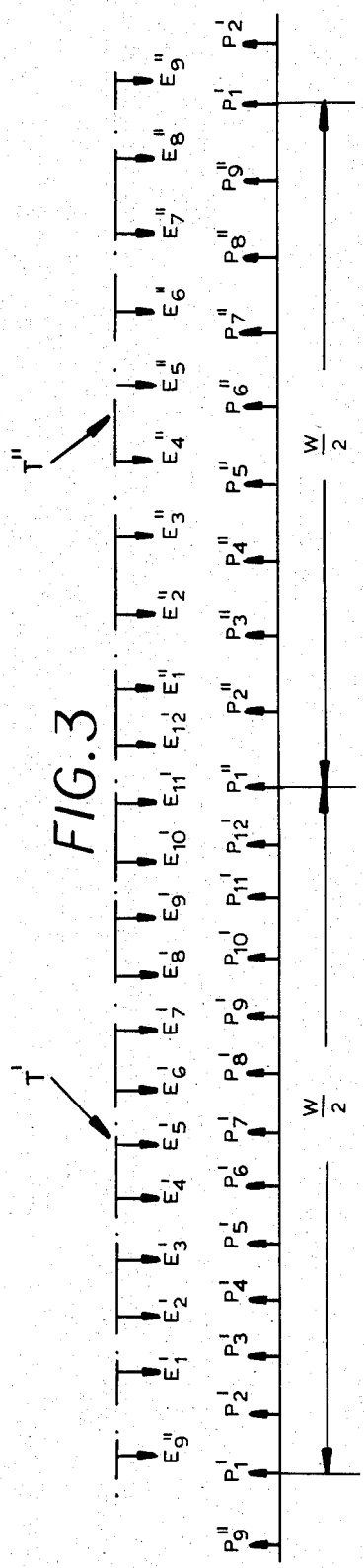
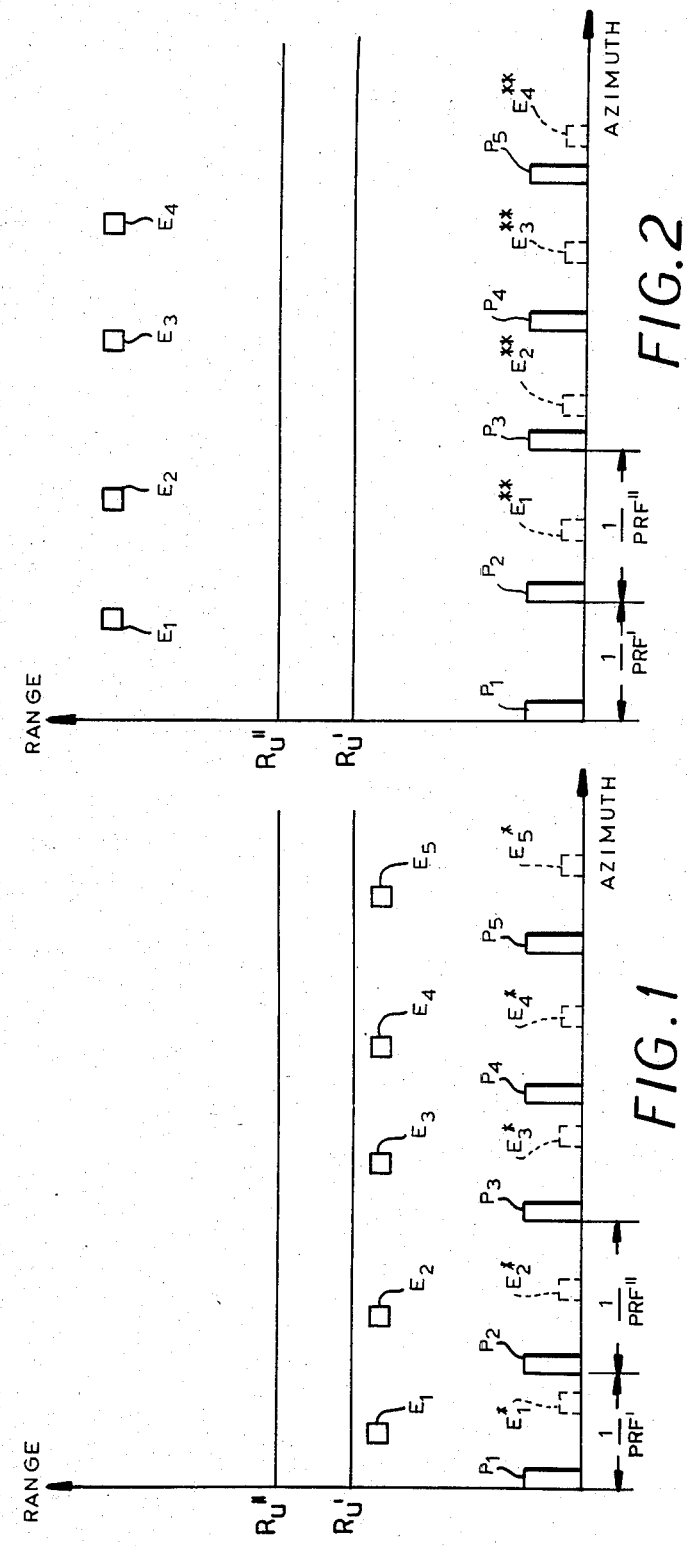
FIG. 3
FIG. 2
FIG. 1

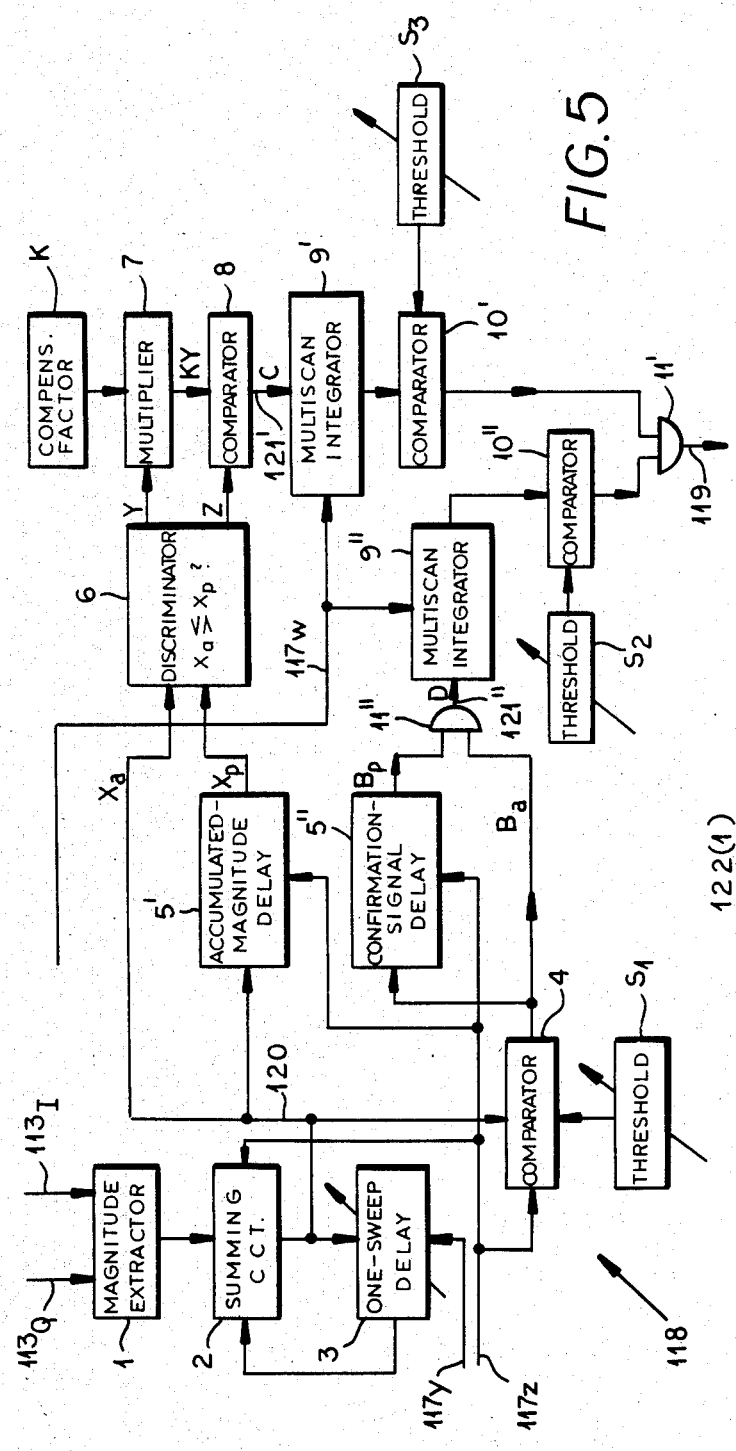
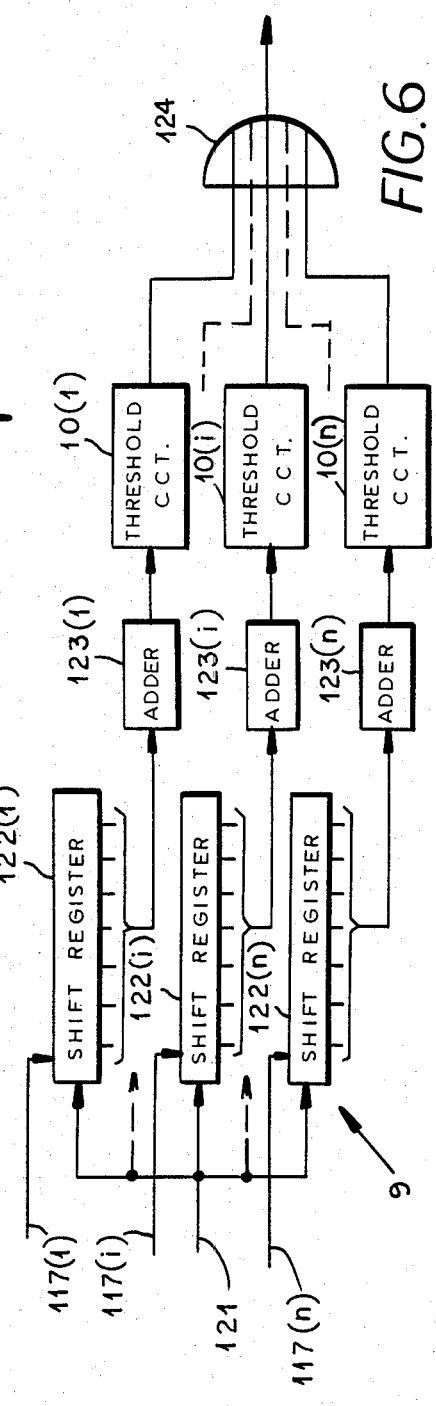
FIG.5
FIG.6

SUPPRESSOR OF SECOND-TIME-AROUND CLUTTER ECHOES FOR MTI PULSE RADAR PROVIDED WITH POWER OSCILLATOR

FIELD OF THE INVENTION

Our present invention relates to a device for identifying and suppressing second-time-around clutter echoes in a pulse radar of the moving-target-indicator (MTI) type whose transmitting section includes a power oscillator for the generation of a pulse-modulated carrier wave.

BACKGROUND OF THE INVENTION

As is well known in the art, the so-called unambiguous range of a pulse radar—i.e. the maximum distance from the radar station to an outlying object from which an echo of an outgoing pulse is received within a range sweep initiated by that pulse—depends on the pulse-repetition frequency (PRF), being given by $c/2f_p$ where c is the propagation speed of the carrier wave and $f_p$ is the chosen PRF. See, for example, pages 2 and 3 of the book "Introduction to Radar Systems" by Merrill i. Skolnik, second edition, McGraw-Hill Book Company, 1980. If a reflecting object (stationary clutter or a moving target) lies beyond that unambiguous range, its echo will arrive at the radar receiver only in the next-following range sweep or possibly in another sweep after that; however, echoes received more than one sweep after emission of the corresponding radar pulse will generally be so weak that they need not be taken into account. Usually, therefore, one need only consider reflections known as second-time-around echoes received in the sweep immediately adjoining the one initiated by the originating pulse.

When the PRF is chosen low enough to provide an extended unambiguous range, ambiguities in the Doppler frequencies of moving targets will arise, resulting in so-called blind speeds; see Skolnik, supra, page 139 under subchapter 4.10. The occurrence of such blind speeds can be minimized by operating the radar transmitter in a staggered-PRF mode, i.e. with periodic switchover between different pulse-repetition frequencies on consecutive sweeps or groups of sweeps (Skolnik, pages 114–117, subchapter 4.3). However, as pointed out by Skolnik (last paragraph of subchapter 4.3), the staggered-PRF mode does not enable a cancellation of second-time-around clutter echoes by conventional means. Such cancellation, the author notes, requires a constant PRF as well as phase coherence between consecutive pulses. That coherence is available when the radar transmitter is of the type shown in Skolnik's FIG. 4.5 (page 105), using a periodically triggered power amplifier in the output of a continuously operating coherent oscillator or COHO, but not when the carrier wave is pulsed by the periodic triggering of a magnetron oscillator as illustrated in Skolnik's FIG. 4.6 (page 106).

The power amplifier used in a transmitter of the first-mentioned type is generally a klystron, particularly in civilian applications such as airport-surveillance radars (ASR) as primarily contemplated for our present invention. In comparison with a magnetron oscillator, however, the use of a klystron in a radar transmitter of medium or high power entails a number of drawbacks including the generation of much higher voltage levels with consequent risk of harmful radiation, the need for liquid cooling with its attendant maintenance problems, as well as greatly increased size, weight and cost.

OBJECTS OF THE INVENTION

The general object of our present invention, therefore, is to provide a suppressor of second-time-around clutter echoes in an MTI pulse radar whose transmitting section includes a triggerable power oscillator such as a magnetron maintaining phase coherence only for the duration of an outgoing pulse.

A more particular object is to provide a combination of power oscillator and suppressor of second-time-around clutter echoes which is effective with both constant-PRF and staggered-PRF operation.

SUMMARY OF THE INVENTION

A device for suppressing second-time-around clutter echoes in accordance with our present invention forms part of an MTI pulse radar of the general type shown in Skolnik's FIG. 4.6 referred to above, i.e. a radar with a transmitting section including a power oscillator triggerable to generate outgoing carrier-wave pulses, rotating antenna means of fixed angular beamwidth coupled to the transmitting section for radiating the generated pulses at the beginning of respective range sweeps and intercepting echoes thereof reflected by outlying objects, and a receiving section coupled to the antenna means for coherently detecting these echoes to determine Doppler speeds of reflecting objects and delivering corresponding output signals to a digital processing stage after elimination of first-time-around echoes in the receiving section by conventional means. A scan by the antenna means of an arc corresponding to its beamwidth encompasses a multiplicity of range sweeps.

The device according to our invention is based on the recognition of the fact that consecutive echoes or groups of echoes from one and the same outlying object—especially when the latter is stationary with reference to the radar—will have virtually unchanged characteristics including substantially constant amplitudes. Thus, our device comprises summing means connected to the output of the receiving section in parallel with the aforementioned processing stage for accumulating the magnitudes of echoes received in a group of consecutive range sweeps occurring in a predetermined scanning interval, the combined number of range sweeps of any two adjoining scanning intervals being fixed and being preferably equal to but in no event greater than the multiplicity of such sweeps encompassed in a beamwidth scan. The accumulated echo magnitudes of any given group are retarded, by delay means connected to the summing means, by a period equal to the scanning interval containing that group. We further provide comparison means with inputs respectively connected to the summing means and to the delay means for detecting a correlation between the accumulated echo magnitudes of a current group and of an immediately preceding group, with emission of a confirmation signal upon detection of such correlation, as well as integrating means connected to the comparison means for adding up confirmation signals recurring in a predetermined number of consecutive returns to the same antenna position, i.e. of complete revolutions of the antenna means. The output of the processing stage is blocked, with the aid of inhibiting means controlled by the integrating means, whenever the sum of the confirmation signals so added equals or exceeds a predetermined threshold.

Our invention is particularly applicable to an MTI pulse radar operating in the staggered-PRF mode, for the purpose of minimizing the occurrence of blind speeds, whose transmitting section is provided with timing means triggering its power oscillator to generate the outgoing pulses with two different but predetermined repetition frequencies in alternate scanning intervals of preferably the same length, each advantageously lasting for substantially half a beamwidth scan. In such a system, of course, the number of sweeps will vary from one scanning interval to the next; our device, therefore, in that case further comprises weighting means inserted between the inputs of the comparison means and the outputs of the summing and delay means for relatively adjusting the accumulated echo magnitudes to compensate for the different number of range sweeps in the current and immediately preceding groups. Since either of these groups can contain more sweeps than the other, the weighting means may include discriminating means for finding the smaller one of the echo-magnitude accumulations and arithmetic means for multiplying the smaller accumulation by a compensatory factor.

Yet another feature of our invention, designed to prevent spurious responses to noise unaccompanied by clutter echoes, resides in the provision of a first threshold comparator connected to the summing means for generating an affirmative signal in response to any echo-magnitude accumulation which at least equals a predetermined first minimum value, other delay means connected to this first threshold comparator for retarding the affirmative signal by a period equal to the scanning interval containing the given group (and thus in a manner corresponding to that in which the echo-magnitude accumulation of that group is treated by the first-mentioned delay means), coincidence means with inputs respectively connected to the first threshold comparator and to the other delay means for generating an enabling signal upon simultaneous presence of affirmative signals from the current and immediately preceding groups, and other integrating means connected to the coincidence means for adding up enabling signals recurring in the same sequence of consecutive antenna revolutions in which the aforementioned confirmation signals are summed by the integrating means referred to above. A second threshold comparator is connected to the other integrating means and controls gating means upstream of the inhibiting means for preventing the blocking of the output of the processing stage whenever the sum of enabling signals fails to reach a second predetermined minimum value.

BRIEF DESCRIPTION OF THE DRAWING

The above and other features of our invention will now be described in detail with reference to the accompanying drawing in which:

FIG. 1 is a graph showing outgoing pulses and first-time-around echoes from point clutter lying within an unambiguous range of a radar operating with PRF staggering;

FIG. 2 is a graph similar to that of FIG. 1, showing second-time-around echoes from point clutter lying beyond the unambiguous range;

FIG. 3 is a graph showing outgoing pulses and second-time-around echoes in a radar embodying out invention;

FIG. 5 is a block diagram of a suppressor of second-time-around clutter echoes forming part of the radar of FIG. 4; and FIG. 6 illustrates details of a multiscan integrator included in the suppressor of FIG. 5.

SPECIFIC DESCRIPTION

Figure 4:
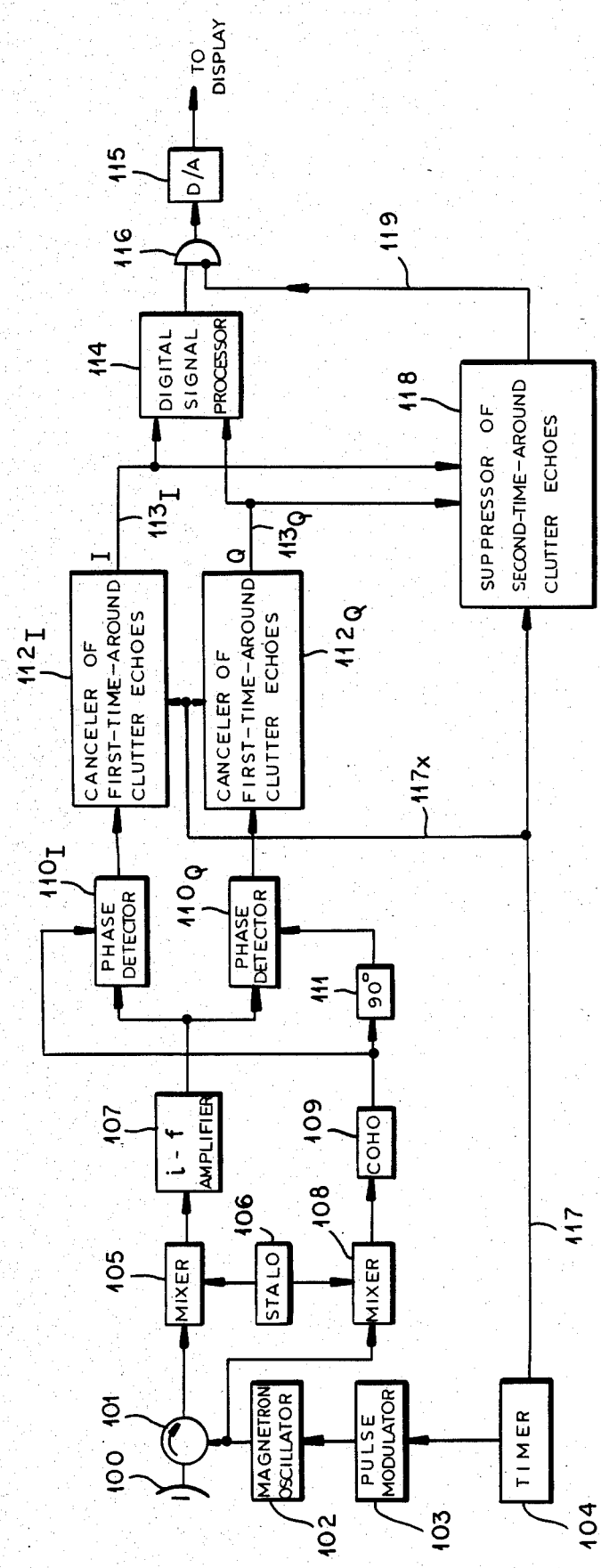
FIG. 4 is a block diagram of such a radar.

In the graph of FIG. 1, in which range and azimuth have been respectively plotted on the ordinate and abscissa axes, we have shown schematically a series of outgoing radar pulses $P_1$, $P_2$ etc. following one another in staggered succession with alternate repetition periods $1/PRF'$ and $1/PRF''$. The limit of the unambiguous range for the shorter sweeps of repetition period $1/PRF'$ has been designated $R_u'$; the corresponding limit of the unambiguous range for the longer sweeps of repetition period $1/PRF''$ is marked $R_u''$. Also shown in FIG. 1 are echoes $E_1$-$E_5$ of pulses $P_1$-$P_5$, reflected by point clutter lying within both unambiguous ranges; the time positions of these echoes upon their arrival at the radar receiver, relative to their originating pulses $P_1$-$P_5$, have been represented in dotted lines at $E_1^*$-$E_5^*$.

Echoes $E_1^*$-$E_5^*$ are all of the first-time-around type, received within the range sweeps initiated by their originating pulses. Thus, the spacing between these pulses and their echoes is invariable for all sweeps. It is therefore possible to cancel those echoes in the known manner by converting each echo into a digitized sample, proportional to its phase relative to the originating pulse, and subtracting from that sample a corresponding sample from the immediately preceding sweep (Sholnik, FIG. 4.21 on page 119), provided that the storage time of the preceding sample is varied from sweep to sweep in conformity with the respective repetition period.

FIG. 2 schematically shows echoes $E_1$-$E_4$ of outgoing pulses $P_1$-$P_4$, reflected by point clutter in a region beyond range limit $R_u''$, along with their corresponding time positions $E_1^{}$-$E_4^{}$ relative to their originating pulses. Echoes $E_1^{}$-$E_4^{}$ are of the second-time-around type, each occurring in a sweep following the one initiated by the originating pulse. Even if pulses $P_1$ etc. were all coherent, the aforedescribed cancellation procedure could not be used since the spacing of, say, echo $E_1^{}$ from the preceding pulse $P_2$ is greater than that of echo $E_2^{}$ from pulse $P_3$ so that the separation of these two echoes does not correspond to the repetition period $PRF''$ of the sweep initiated by pulse $P_2$.

If the reflecting object lay between range limits $R_u'$ and $R_u''$, the sweeps initiated by the even-numbered pulses would each contain two echoes while the sweeps initiated by the odd-numbered pulses would be free of echoes, thereby again preventing cancellation.

FIG. 3 schematically depicts two groups of outgoing pulses $P_1'$-$P_{12}'$ and $P_1''$-$P_9''$, of respective recurrence periods $PRF'$ and $PRF''$, emitted in consecutive scanning intervals $T'$, $T''$ pursuant to our present invention. Each interval lasts for half a scan of a beamwidth W so that pulses successively illuminate the same reflecting object when the radar antenna rotates counterclockwise as indicated by an arrow. Second-time-around echoes of pulses $P_1'$-$P_{12}'$ and $P_1''$-$P_9''$, generated by point clutter outside range limit $R_u''$ (FIG. 2), have been designated $E_1'$-$E_{12}'$ and $E_1''$-$E_9''$; in fact, another echo $E_9''$ from the last pulse $P_9$ of an immediately preceding group appears at left in the sweep started by pulse $P_1'$ while the right-hand echo $E_9''$ falls outside the two consecutive intervals $T'$, $T''$. Still, these two intervals respectively encompass twelve and nine echoes corresponding to the numbers of their outgoing pulses. These numbers would not change significantly if, as discussed with reference to FIG. 2, the reflecting clutter lay between range limits $R_u'$ and $R_u''$.

In FIG. 4 we have illustrated a radar transceiver emitting, during adjoining beamwidth scans, two groups of pulses as shown in FIG. 3. The transceiver comprises a rotating antenna 100 working into a duplexer 101 to which outgoing pulses are supplied by a magnetron oscillator 102 that is activated by a pulse modulator 103 under the control of a trigger generator or timer 104. The timer operates to alternate between pulse-repetition periods PRF' and PRF'' as described above. Incoming echoes are delivered by duplexer 101 to a mixer 105 to which a heterodyning frequency is supplied by a stable local oscillator (STALO) 106. Mixer 105 feeds an intermediate-frequency amplifier 107 while another mixer 108, receiving the output frequency of STALO 106 along with a recurrent locking pulse from oscillator 102, controls a coherent oscillator (COHO) 109. The output signals of i-f amplifier 107 are supplied in parallel to two phase detectors $110_I$ and $110_Q$ of an in-phase channel and a quadrature channel, the two phase detectors also receiving the output frequency of COHO 109 with interposition of a 90° phase shifter 111 between the COHO and detector $110_Q$. Two MTI cancelers $112_I$ and $112_Q$ of first-time-around clutter echoes lie in series with phase detectors $110_I$ and $110_Q$, their output leads $113_I$ and $113_Q$ extending to a digital processor 114 supplying a display by way of a digital/analog converter 115, with interposition of an AND gate 116 serving to inhibit signal transmission under circumstances to be described hereinafter. Components 100–115 are conventional and correspond to those illustrated in FIGS. 4.6 and 4.21 of Skolnik, plages 106 and 119; processing stage 114 includes a magnitude extractor and a digital/analog converter shown in the latter Figure.

A bus 117 extending from timer 104 has a lead 117x terminating at cancelers $112_I$ and $112_Q$ for periodically altering the delay times of their sample stores in accordance with the pulse sequences of FIG. 3, i.e. after every half-beamwidth scan. Bus 117 terminates at a device 118, designed as a suppressor of second-time-around clutter echoes according to our invention, which has inputs connected to leads $113_I$, $113_Q$ and an output lead 119 extending to an inverting input of AND gate 116. Suppressor 118, whose structure will be described with reference to FIG. 5, serves to block the output of processing stage 114 by energizing the lead 119 whenever an analysis of the amplitudes of echoes received in consecutive scanning intervals reveals the presence of clutter lying beyond range limit $R_u'$ (FIG. 2).

According to the embodiment shown in FIG. 5, suppressor 118 comprises a magnitude extractor 1 which is similar to the extractor included in processing stage 114 and, in fact, could be the same unit. The magnitude or peak amplitude $M = \sqrt{I^2 + Q^2}$ of each incoming uncanceled echo, where I and Q are the digitized output signals of phase detectors $110_I$ and $110_Q$, is supplied to a summing circuit 2 having an output lead 120. Circuit 2 has a feedback loop including a delay unit 3 (e.g. a shift register) which retards the signal on lead 120 by one sweep before returning it to an additive input of that circuit; unit 3 is controlled by synchronizing signals on a lead 117y, forming part of bus 117, by which the timer 104 of FIG. 4 modifies its delay in accordance with the repetition periods 1/PRF' and 1/PRF'' of consecutive pulse groups. Lead 120 further extends to a comparator 4 receiving an adjustable threshold voltage $S_1$, this comparator being turned on by a command of timer 104 on a lead 117z of bus 117 at the end of each scanning interval in order to determine whether the echo magnitudes accumulated in summing circuit 2, represented by a voltage $X_a$, are at least equal to that threshold; in such a case the binary output of comparator goes high to generate an affirmative signal $B_a$. If, however, voltage $X_a$ on lead 120 falls short of threshold $S_1$, it is considered exclusively due to noise and does not give rise to an affirmative signal. Summing circuit 2 is cleared concurrently with the activation of the comparator.

Voltage $X_a$ on lead 120 is also fed to a delay circuit 5' which retards it by the duration of one pulse group, i.e. by a scan of half a beamwidth, so as to provide an output signal $X_p$ corresponding to the accumulated magnitudes of the immediately preceding group (in contrast to voltage $X_a$ pertaining to the actual or current group). A similar delay is introduced for the affirmative signal $B_a$ from comparator 4 by a circuit 5'' emitting an affirmative signal $B_p$ pertaining to the preceding group.

The actual-group and preceding-group voltages $X_a$ and $X_p$ arrive at respective inputs of a discriminator 6 which selects the smaller one of those voltages as an output signal Y fed to a multiplier 7; the larger voltage appears as a signal Z at one input of a comparator 8 whose other input is connected to the output of multiplier 7. The multiplier further receives a constant compensating factor K taking into account the difference between the numbers of pulses $P_1'-P_{12}'$ and $P_1''-P_9''$ in the two groups shown in FIG. 3; in the present instance, in which these numbers respectively are twelve and nine, constant K will have a value of about 4/3 which may be limitedly adjustable, if necessary. The weighted signal KY substantially equals the signal Z if each of the outgoing pulses results in a second-time-around echo as described above. Upon detecting such an amplitude correlation, comparator 8 delivers a binary confirmation signal C on an output lead 121' to a multiscan integrator 9' at an instant when the latter is activated by a command on an extension 117w of timer bus 117. Such activation occurs at the end of each scanning interval T' or T'', concurrently with the readout of delay circuits 5' and 5'' by a command on lead 117z. Discriminator 6, compensator K, multiplier 7, comparator 8, and accumulated magnitude delay 5' form the weighting means.

Integrator 9', which may have a structure as described hereinafter with reference to FIG. 6, adds up the confirmation signals C generated over a predetermined number of full antenna revolutions in corresponding scanning positions; such addition takes place at the end of each interval containing one of the pulse groups shown in FIG. 3. If the sum of the confirmation signals generated during this sequence of revolutions equals or exceeds an adjustable threshold $S_3$ fed to comparator 10', the latter energizes one input of a coincidence circuit shown as an AND gate 11' whose output is connected to the lead 119 seen in FIG. 4. A similar AND gate 11'' receives the actual-group and preceding-group affirmative signals $B_a$ and $B_p$ and, upon their coincidence, supplies a binary enabling signal D on an output lead 121'' to another multiscan integrator 9'' identical with integrator 9' and likewise controlled by commands on bus extension 117w. When the sum of enabling signals D, added up in integrator 9'' for each of the aforementioned antenna positions, equals or exceeds an adjustable threshold $S_2$ after the same number of antenna revolutions as are counted by integrator 9', as determined by a comparator 10'', another input of AND gate 11' is energized to generate a blocking command on lead 119. Thus, echoes passed by cancelers 112$_I$ and 112$_Q$ of FIG. 4 to processing stage 114 cannot traverse the gate 116 if the presence of remote clutter in a given antenna position, generating second-time-around echoes over a suitable number of times, is established by comparator 10' with simultaneous verification by comparator 10'' that not only noise is present on the output lead 120 of summing means 2, 3.

Multiscan integrators 9' and 9'' may have the structure shown for a generic integrator 9 in FIG. 6. With n antenna positions in which second-time-around clutter echoes may be detected, this integrator comprises n shift registers 122(1), ... 122(i), ... 122(n) having data inputs connected in parallel to a lead 121 representative of leads 121' and 121'' of FIG. 5. An activating input of shift register 122(1) is connected to a lead 117(1), forming part of the bus extension 117w shown in FIG. 5, which allows the loading of the first stage of that register with a bit of logical value "1" of a binary signal (C or D) then appearing on input lead 121. Analogously, activating inputs of registers 122(i) and 122(n) are shown connected to other leads 117(i) and 117(n) of bus extension 117w which are energized by the timer 104 in different positions of the antenna 100 (FIG. 4). The several stage outputs of these shift registers are connected in parallel to respective adders 123(1), 123(i) and 123(n) working into associated threshold circuits 10(l), 10(i) and 10(n) jointly representative of comparators 10' and 10'' of FIG. 5. Blocking signals from these individual comparison circuits are transmitted through an OR gate 124 to the AND gate 11' of FIG. 5 whenever enough stages of the respective shift registers contain "1" bits to let their sum reach or exceed the threshold $S_2$ or $S_3$.

The number of stages of shift registers 122(l)-122(n) determines the number of antenna revolutions during which integrators 9' and 9'' of FIG. 5 add the respective signals C and D in order to check for second-time-around clutter echoes distinct from pure noise. When the digital signal to be fed to converter 115 of FIG. 4 leaves the processing stage 114 with a suitable delay, a blocking signal of a duration equal to a beamwidth scan will leave the OR gate 124 in time to inhibit the transmission of a display-activating signal based upon pulse echoes received in the two immediately preceding scanning intervals. Adders 123(l)-123(n) do not store their sums and operate only when the associated shift registers are activated.

If, for example, the beamwidth of the antenna—conventionally measured between −3 dB limits—is 2° in azimuth, the number n of shift registers, adders and threshold circuits in integrators 9' and 9'' will be 360.

Our invention could also be applied to a radar transceiver operating with three (or more) pulse-repetition frequencies, though this would require a more elaborate suppressor 118 especially as concerns the discriminator 6. Furthermore, if scanning intervals T' and T'' were unequal, the timing command on lead 117z would have to take their different durations into account; compensatory factor K would then also have to be suitably modified.

A radar with power-oscillator transmitter and pulse-group processing, adapted to be used with an echo suppressor as here disclosed, has been described in a paper titled "On the azimuthal accuracy of an FFT-based signal processor for air traffic control radars", by Egidio Cristofalo and Gaspare Galati, which appeared in No. 1 of Vol. 7 (1980) of SELENIA TECHNICAL REVIEW published by our assignee.

We claim:

1. In a pulse radar with a transmitting section including a power oscillator triggerable to generate outgoing carrier-wave pulses, rotating antenna means of fixed angular beamwidth coupled to said transmitting section for radiating said pulses at the beginning of respective range sweeps and intercepting echoes thereof reflected by outlying objects, timing means for tiggering said power oscillator to generate said outgoing pulses with two different predetermined repetition frequencies in alternate scanning intervals, said scanning intervals being all of the same length with consequent variation of the number of range sweeps from one scanning interval to the next, and a receiving section coupled to said antenna means for coherently detecting said echoes to determine Doppler speeds of reflecting objects and delivering corresponding output signals to a digital processing stage after elimination of first-time-around echoes in said receiving section, a scan by said antenna means of an arc corresponding to said beamwidth encompassing a multiplicity of said range sweeps, the combination therewith of a device for suppressing second-time-around clutter echoes, said device comprising:

summing means connected to the output of said receiving section in parallel with said processing stage for accumulating the magnitudes of echoes received in a group of consecutive range sweeps occurring in a predetermined scanning interval, the combined number of range sweeps of any two adjoining scanning intervals being fixed and not greater than said multiplicity;

first delay means connected to said summing means for retarding the accumulated echo magnitudes of any given group by a period equal to the scanning interval containing the given group;

first threshold comparison means connected to the output of said summing means for generating an affirmative signal in response to any echo magnitude accumulation of a current group and of an immediately preceding group at least equaling a first predetermined threshold;

second delay means coupled to said first threshold comparison means for retarding output of said first threshold comparison means by a period equal to the scanning interval containing said current group;

first coincidence means with inputs respectively connected to said first threshold comparison means and to said second delay means for generating an enabling signal upon simultaneous presence of affirmative signals from said current and said immediately preceding groups;

first integrating means connected to said first coincidence means for adding up enabling signals recurring in a predetermined number of consecutive returns to the same antenna position;

a second threshold comparison means coupled to said first integrating means for generating first output signals when the sum of said enabling signals exceed a second predetermined threshold;

weighting means inserted between the inputs of said first comparison means and the output of said summing means respectively connected thereto for relatively adjusting the resulting echo-magnitude accumulations to compensate for the different number of range sweeps in said current and said immediately preceding groups;

second integrating means being coupled to said weighting means for summing the ouput of said weighting means over a predetermined number of full antenna revolutions;

third threshold comparison means coupled to second integrating means for generating second output signals if the summation of the output of said weighting means exceeds a third predetermined threshold;

a second coincidence means coupled to said second threshold comparison means and said third threshold comparison means and said third threshold comparison means for generating an inhibiting signal upon coincidence of said first and second output signals; and inhibiting means controlled by said second coincidence means for blocking the output of said processing stage in said antenna position upon the presence of said inhibiting signal.

2. The combination defined in claim 1 wherein the weighting means comprise:

third delay means coupled to said output of said summing means for delaying said magnitudes of echoes in said immediately proceeding groups;

discriminator means coupled to said output of said summing means and the output of said third delay means for generating a first magnitude output signal which is the greater of said output of said summing means and said output of said third delay means and a second magnitude output signal which is the lesser of said output of said summing means and said output of said third delay means;

multiplier means coupled to said discriminator means for multiplying said second magnitude output signal by a predetermined value; and comparing means coupled to said discriminator means, said multiplier means and said second integrating means for generating confirmation signal to said second integrating means when the output of said multiplier means equals said first magnitude output signals.

3. The combination defined in claim 2 wherein said predetermined value is substantially 4/3.

4. In a pulse radar with a transmitting section including a power oscillator triggerable to generate output carrier-wave pulses, rotating antenna means of fixed angular beamwidth coupled to said transmitting section for radiating said pulses at the beginning of respective range sweeps and intercepting echoes thereof reflected by outlying objects, timing means for triggering said power oscillator to generate said outgoing pulses with two different predetermined repetition frequencies in alternate scanning intervals, said scanning intervals being all of the same length with consequent variation of the number of range sweeps fron one scanning interval to the next, and a receiving section coupled to said antenna means for coherently detecting said echoes to determine Doppler speeds of reflecting objects and delivering corresponding output signals to a digital processing stage after elimination of first-time-around echoes in said receiving section, a scan by said antenna means of an arc corresponding to said beamwidth encompassing a multiplicity of said range sweeps, the combination therewith of a device for suppressing second-time-around clutter echoes, said device comprising:

summing means connected to the output of said receiving section in parallel with said processing stage for accumulating the magnitudes of echoes received in a group of consecutive range sweeps occurring in a predetermined scanning interval, the combined number of range sweeps of any two adjoining scanning intervals being fixed and not greater than said multiplicity;

first delay means connected to said summing means for retarding the accumulated echo magnitudes of any given group by a period equal to the scanning interval containing the given group;

comparison means connected to output of said summing means for detecting correlation between the accumulated echo magnitudes of a current group and of an immediately preceding group, with emission of a confirmation signal upon detection of such correlation;

first integrating means connected to said comparison means for adding up enabling signals recurring in a predetermined number of consecutive returns to the same antenna position;

inhibiting means controlled by said first integrating means for blocking the output of said processing stage in said antenna position upon the sum of said enabling signals at least equaling a first determined threshold;

weighting means inserted between the inputs of said comparison means and the output of said summing means respectively connected thereto for relatively adjusting the resulting echo-magnitude accumulations to compensate for the different number of range sweeps in said current and immediately preceding groups, wherein said weighting means comprise discriminating means for finding the smaller one of said magnitude accumulations and an arithmetic means for multiplying the smaller echo magnitude accumulation by a compensatory factor; and second integrating means being coupled to said weighting means and to said inhibiting means for blocking the output of said processing stage in said antenna position upon the sum of said confirmation signals at least equaling a second predetermined threshold.

5. The combination defined in claim 4 wherein each of said scanning intervals lasts for substantially half a scan of said arc.

6. The combination defined in claim 4 wherein said summing means comprises an adder with a feedback loop introducing a delay of one range sweep.

* * * * *